UNITED STATES PATENT OFFICE.

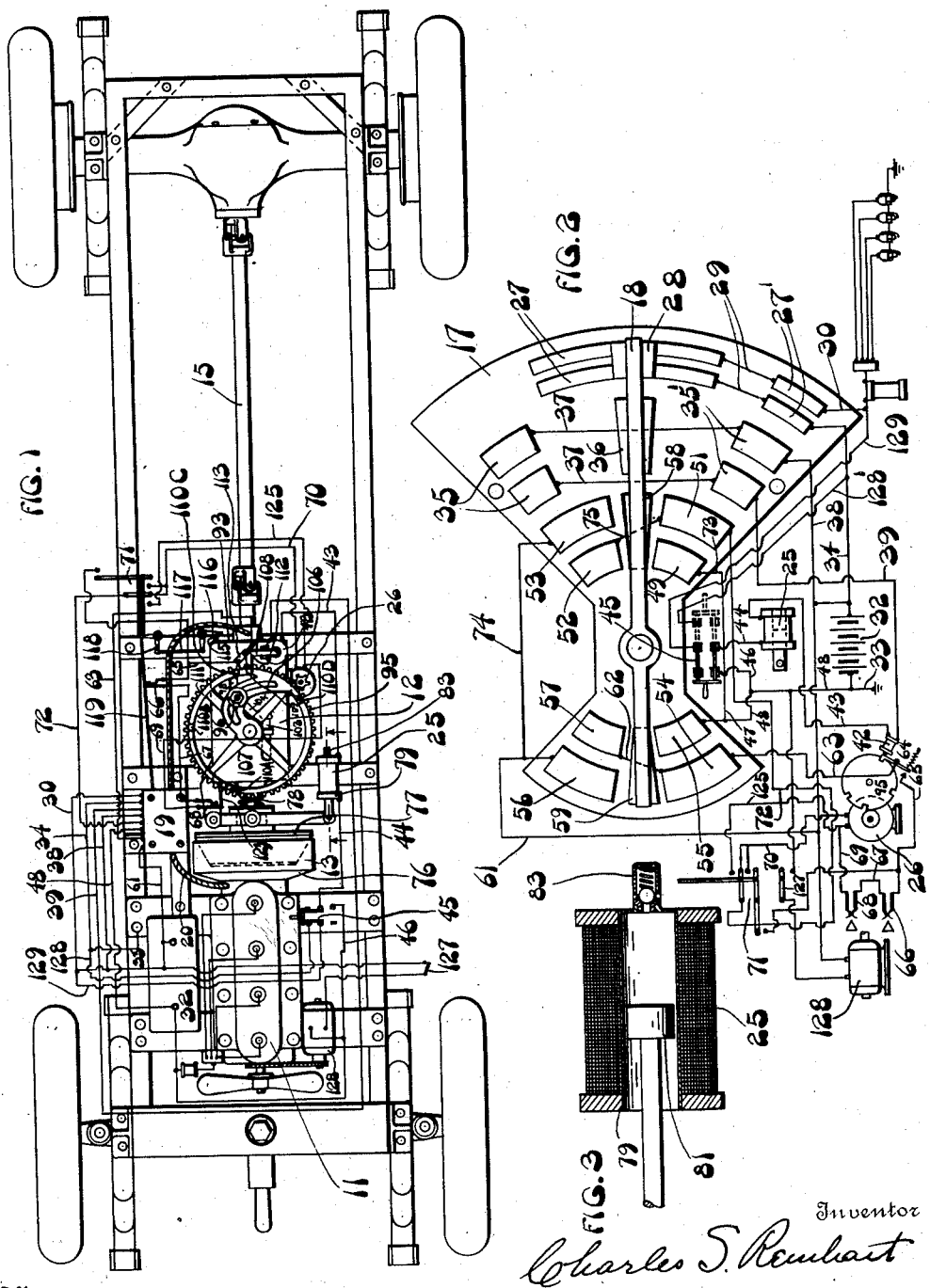

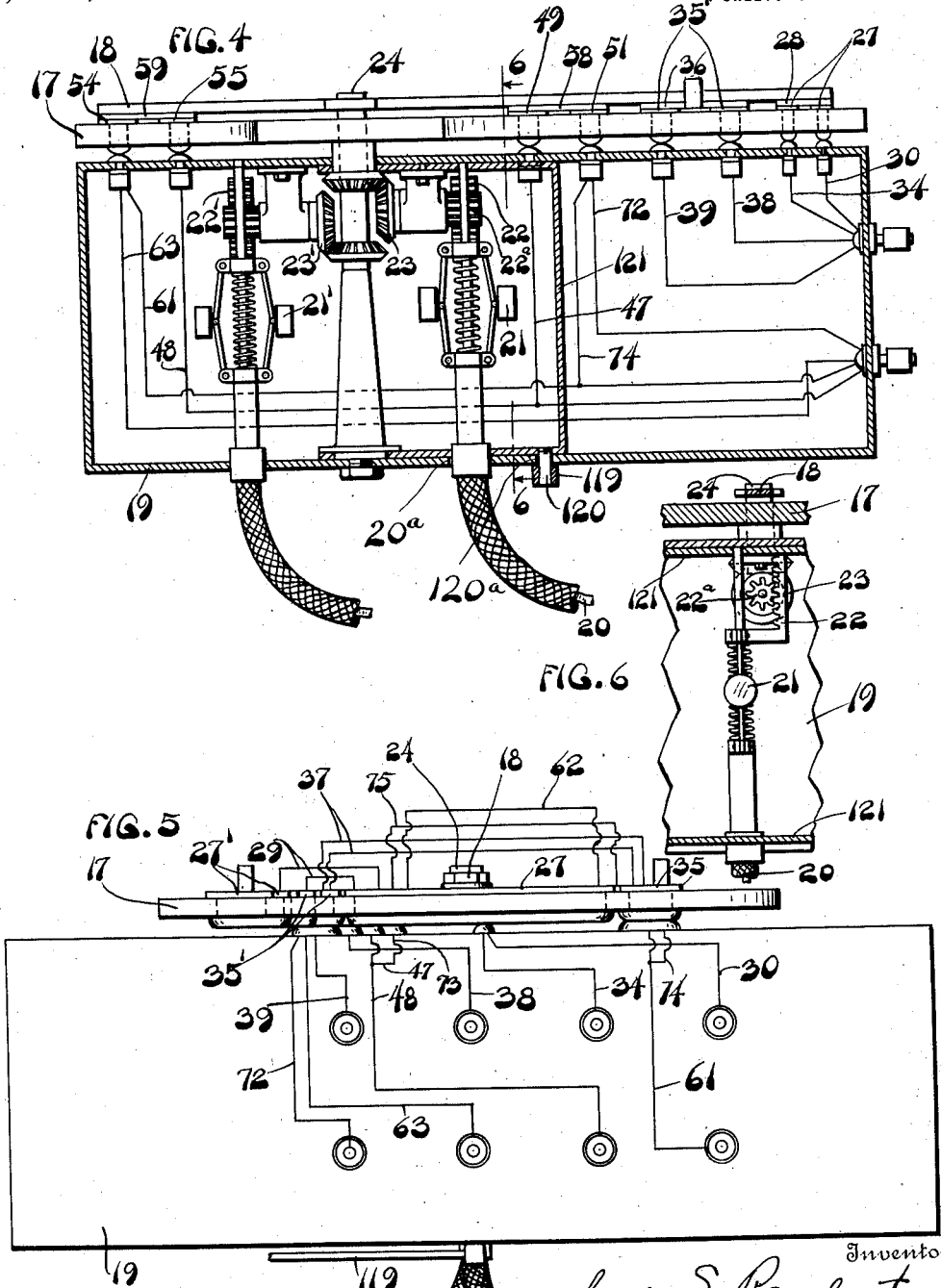

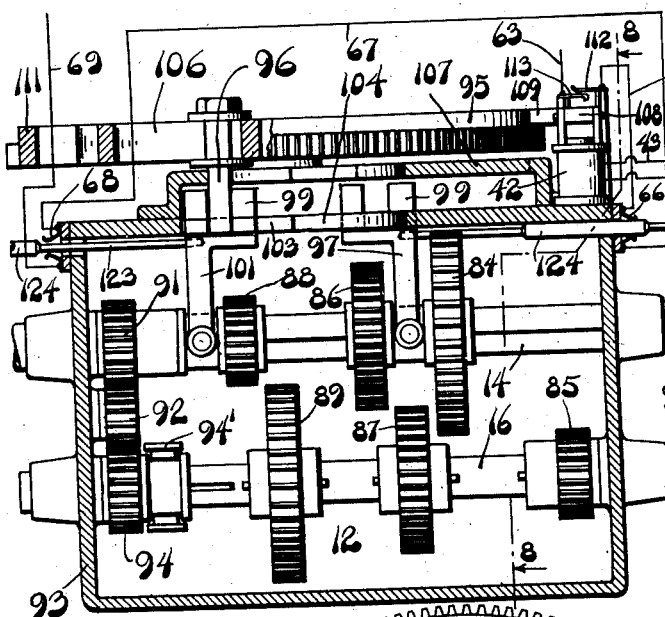

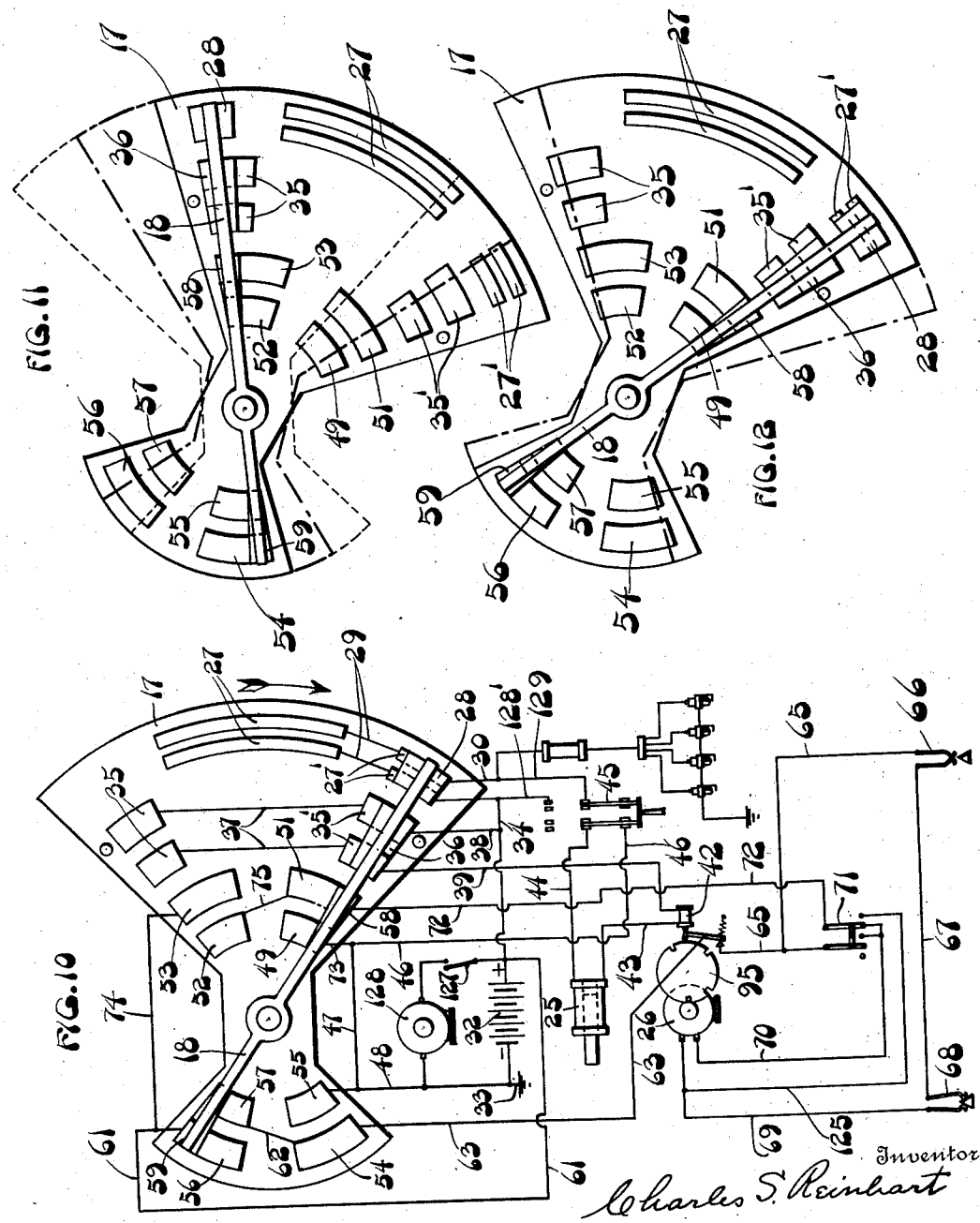

CHARLES S. REINHART, OF CINCINNATI, OHIO.

SPEED-CHANGE MECHANISM.

1,159,709.  Specification of Letters Patent.  Patented Nov. 9, 1915.

Application filed April 7, 1913. Serial No. 759,412.

*To all whom it may concern:*

Be it known that I, CHARLES S. REINHART, a citizen of the United States of America, and resident of Cincinnati, county of Hamilton, and State of Ohio, have invented certain new and useful Improvements in Speed-Change Mechanisms, of which the following is a specification.

This invention relates to transmission mechanisms, and has for an object to produce improved automatic means for controlling the operation of speed change mechanisms, forming a part of the tranmission mechanism, or for varying the torque or purchase of the transmission mechanism, in accordance with variations in the resistance or in the load encountered. This and other objects I attain in a transmission mechanism embodying the features herein described and illustrated in the drawings which accompany and form a part of this application.

Throughout the following description, I have considered my invention as embodied in the power transmission mechanism of an automobile or self-propelled vehicle, but with no idea of in any way limiting the application of the invention, since it will be apparent to those skilled in the art, that my invention has a wide range of application.

In the drawings accompanying this application, and forming a part thereof, Figure 1 is a plan view of the frame portion of a vehicle equipped with my invention; the arrangement of the apparatus, and particularly the wiring, is somewhat diagrammatic, for the purposes of description. Fig. 2 is a diagrammatic view of an automatic controller which forms a detail of my invention and which is shown in connection with a wiring diagram illustrating electrical connections which may be employed in apparatus embodying my invention. Fig. 3 is a sectional view of a solenoid, which, in the illustrated embodiment of my invention, operates to control the operation of the cone or master clutch, forming a part of the transmission mechanism. Fig. 4 is a side elevation of the controller shown in Fig. 2 and is illustrated in connection with a side elevation of the actuating mechanisms of the controller, the casing of the actuating mechanisms being shown in section, for convenience of illustration. Fig. 5 is an end elevation of the controller and of the casing shown in Fig. 4. Fig. 6 is a fragmental sectional view along the line 6—6 of Fig. 4, and illustrates the actuating mechanism of a plate which forms a part of the automatic controller. Fig. 7 is a sectional view along the line 7—7 of Fig. 9 and illustrates a set of speed change gears and automatically controlled means for controlling the operation of the gears. Fig. 8 is a sectional view along the line 8—8 of Fig. 7; and Fig. 9 is a plan view of the apparatus illustrated in Figs. 7 and 8. Fig. 10 is a view of the controller, corresponding to Fig. 2, and showing the plate 17 and the arm 18 in the positions they occupy when the speed change gears are in the neutral position, as shown in Fig. 7. A somewhat simplified wiring diagram is also shown in connection with Fig. 10. Fig. 11 illustrates in full lines the relative positions of the plate 17 and arm 18, during the operation of shifting from the low to the intermediate speed gears. The normal position of the plate is shown in dotted lines and the position to which the plate is positively moved by the operation of shifting the gear 86, is shown by the dot-dash lines. Fig. 12 shows in full lines the relative positions of the plate and arm during the operation of shifting from the high speed gears to the intermediate speed gears, and the dot-dash lines show the position to which the plate is positively moved by the shifting of the gears.

The transmission mechanism of the vehicle illustrated, includes an engine or motor 11, a torque-varying or speed change device 12, a clutch mechanism 13 for coupling the engine shaft to the driving shaft 14, of the speed change device, and a propeller shaft 15 of the vehicle, which is operatively coupled to the driven shaft 16 of the speed change device and is operatively connected to the rear axle of the vehicle in the ordinary manner. A load-responsive mechanism is also provided for controlling the operation of the transmisison mechanism, so that, if the load on the engine becomes too heavy or great for a certain speed of the vehicle, the load-responsive means will automatically actuate the torque-varying or speed change device, to shift from a high to a lower speed gear, with a greater torque or purchase, and will thereby render the power of the engine effective and sufficient in driving the vehicle at a lower speed. If the power delivered by the engine is in excess of that required by the vehicle while being propelled through a low speed gear, the load-responsive device will automatically actuate the speed change device, to shift from the low to a higher speed gear, with a smaller torque or purchase, so that the engine will, at all times, operate at or near full load, and without the danger of being overloaded.

One of the principal objects of my present invention is to provide a power transmission mechanism which will simplify the operation of driving an automobile, propelled by an internal combustion engine and equipped with speed change gears, by eliminating the necessity of manually shifting the gears.

Another object is to provide means which will operate automatically to maintain the load on the engine substantially constant and which will therefore prevent the engine from being overloaded and stalling, or from being underloaded and racing, during the running of the vehicle.

The load-responsive device includes a controller which consists of a centrifugally controlled, pivotally mounted plate 17, and a centrifugally controlled, pivotally mounted contact arm 18, which is adapted to move across the plate 17 and to coöperate with electrical contact bars mounted on the plate, for the purpose of opening and closing actuating circuits of electrically actuated devices, which form a part of the load responsive mechanism. The plate is controlled from the engine shaft, so that it occupies different positions relatively to its mounting frame or the casing 19, for different speeds of the engine. This is accomplished by employing apparatus which, to some extent, embodies the principle employed in the well known speedometer construction, and consists of centrifugal weights 21, so mounted on a rotatable shaft 20 that they are capable of occupying different relative positions for different speed of rotation of the shaft 20. The weights are so connected to a rack 22 that it is moved to different positions in response to variations in the relative positions of the weights. The rack operates, through a pinion 22ª and bevel gears 23, to turn the plate 17 about its pivotal point. The rotating shaft, on which the weights are mounted, is operatively connected to the engine shaft in any suitable manner, so that its speed of rotation is equal or proportional to the speed of the engine shaft. The arm 18 is actuated by similar apparatus, which is driven by the driven shaft 16, of the speed change gears, or by the propeller shaft 15 of the vehicle. As illustrated, the arm-actuating apparatus consists of the centrifugal weights 21' which are so mounted on a rotatable shaft that they are capable of reciprocating a rack 22' in response to variations in speed of their driving shaft. The rack 22' is capable of imparting its motion to the arm 18, through the agency of bevel gears 23' and an arbor 24 on which the arm 18 is mounted. With this arrangement the plate 17 moves to different positions, in response to variations in speed of the engine shaft and the arm 18 moves to different positions in response to variations in the speed of the propeller shaft of the vehicle, and consequently the relative positions of the plate 17 and the arm 18 indicates the relative speeds of the engine shaft and of the propeller shaft. In addition to this, the plate 17 is capable of being positively shifted, relatively to the arm 18, at the time of shifting the speed change gears, for the purpose of varying the torque or purchase of the transmission mechanism, and consequently, it acquires a new zero speed position for each speed change gear employed as a driving agent. This is accomplished, in the apparatus illustrated, by shifting the position of the plate actuating apparatus about the arbor 24, when the gears of the speed change device are shifted. The casing 19 not only supports the plate 17, but it also incloses the actuating apparatus of the plate and the arm. The plate 17 is composed of two sector-shaped portions which are secured together at their apexes, and the plate is so mounted that its pivotal point is between the sector shaped portions. The arm 18 swings across the plate for the purpose of engaging contact bars, mounted thereon, and of completing the actuating circuits of the ignition apparatus of the engine, the actuating circuit of a controlling solenoid 25, of the clutch mechanism 13; and the actuating circuit of an actuating motor 26, of the speed change gears.

The ignition system of the engine is controlled by means of two pairs of arc-shaped bars 27 and 27', which are mounted on the plate 17 and which are adapted to be engaged by a contact piece 28, mounted on the arm 18. Each of the bars 27 is connected to one of the bars 27' by means of a wire 29, and one of the bars 27' is connected by means of a wire 30, to one lead of the ignition system 31 of the engine. The ignition system, illustrated, is grounded on the frame of the machine, and consequently the other lead of the system is connected to a battery or other source of electrical potential 32 by means of a wire 33, which is grounded on the frame. The other bar 27' is electrically connected to the battery 32 by means of a wire 34. The circuit just described is completed by means of a contact piece 28, which is mounted on the arm 18, and is adapted to contact with both of the bars 27, or both of the bars 27', in accordance with the position which the arm occupies, relatively to the plate. When the piece 28 contacts with both the bars 27, current flows from the battery through the wire 34, through the contact piece 28, the wire 30, the ignition system, the frame of the machine, and back through the wire 33 to the battery. The plate 17 is also provided with two pairs of contact bars 35 and 35', and a contact piece 36 is so mounted on the arm 18, that it is adapted to electrically connect the two bars of one pair or the other, when the arm 18 is moved to one extreme position or the other, with relation to the plate 17. As shown in Fig. 10, each bar of the pair 35 is connected to one of the bars 35' by means of a wire 37, and the bars 35' are electrically connected, so that when the contact piece 36 engages them, current will flow from the battery through the wire 34, through a branch wire 38, one contact bar 35', the contact piece 36, the other contact bar 35', through a wire 39, the winding of an electro-magnet 42, a wire 43, the winding of the solenoid 25, a wire 44, a double-throw switch 45, and through the wires 46 and 48, back to the battery. When the contact piece 36 engages the bars 35, current flows through substantially the same circuit, except that the wires 37 and the contact bars 35 are included in it. With this arrangement the solenoid is energized when the arm occupies a position near either edge of the plate 17, or in other words, when the contact piece 36 electrically connects the bars of either of the sets 35 or 35'. The plate 17 is also provided with contact bars 49, 51, 52, 53, 54, 55, 56 and 57, which are arranged in two groups of four bars each, and each group is located on opposite sides of the pivotal point of the plate. The bars of each group are arranged in pairs and those of one group are adapted to coöperate with a contact piece 58, mounted on the arm 18, while the bars of the group on the opposite side of the pivotal point are adapted to be engaged by a contact piece 59, mounted on the arm, as the arm swings from one extreme position to the other, relatively to the plate. This arrangement of bars and contact pieces is employed for the purpose of providing an automatic controller and an automatic reversing switch for the motor 26. When the arm 18 is moved to such a position, relatively to the plate 17, that the contact piece 58 engages the plates 49 and 51, of one group, and the contact piece 59 engages the bars 56 and 57 of the other group, current flows from the battery 32 through a wire 61, to the bar 56, through the contact piece 59, to the bar 57, from the bar 57 through a wire 62 to the bar 54, and thence through a wire 63, an electro-mechanically controlled motor control and gear locking device 64, a wire 65, a circuit breaker 66, a wire 67, a circuit breaker 68, and a wire 69, to one terminal of the motor 26. Current from the motor returns through the wire 70, a manually controlled reverse switch 71, a wire 72, the bar 51, the contact piece 58, the bar 49, a wire 73, and the wires 47 and 48, back to the battery. Current flowing through this circuit drives the motor 26 in one direction, which, for convenience of description, may be termed the forward direction, as illustrated by the unfeathered arrow in Fig. 9. When the arm 18 occupies such a position that the contact piece 58 electrically connects the bars 52 and 53, and the contact piece 59 electrically connects the bars 54 and 55, the flow of current through the motor 26 is reversed and it is driven in the opposite or the reverse direction. With the arm 18 in such a position, current from the battery flows through the wire 61, a branch wire 74, the bar 53, the piece 58, the bar 52, a wire 75, the bar 51, the wire 72, the reverse switch 71, and the wire 70, to one terminal of the motor 26. From the motor the current returns through the wire 69, the circuit breaker 68, the wire 67, the circuit breaker 66, the wire 65, the electro-mechanical device 64, the wire 63, the bar 54, the contact piece 59, the bar 55 and through the wire 48 to the battery.

The clutch mechanism or master clutch 13, illustrated in Fig. 1 of the drawings, consists of a member 76, which is shown rigidly mounted on the shaft of the engine 11, and the member 77, which is splined or otherwise secured to the driving shaft 14 of the speed change device 12, so that it can be moved into and out of clutching engagement with the member 76. A coil spring 78 is shown in Fig. 1 for normally holding the separate parts of the clutch in clutching engagement with each other and for thereby operatively connecting the engine shaft to the driving shaft 14 of the speed change gears. The solenoid 25 is employed for the purpose of moving the member 77 out of clutching engagement with the member 76, and thereby operatively disconnecting the engine from the speed change device.

As illustrated in Fig. 3, the solenoid is provided with a spool 79, which forms a support for the winding, and also forms a guide for a plunger 81, which is adapted to form a core for the solenoid and is capable of moving into the central passage of the spool, in response to the magnetic pull resulting from a passage of current through the winding. The plunger is operatively connected to the member 77 of the clutch 13, in any suitable manner. When a current passes through the winding of the solenoid, the plunger 81 is drawn into the central passage of the spool, and thereby actuates the lever to break the clutching engagement between the members 76 and 77, and to operatively disengage the engine from the transmission mechanism of the vehicle. The construction of the spool 79 and the plunger 81 is such that the solenoid will act quickly in breaking clutching engagement between the members 76 and 77, but will retard the action of the spring 78 in forcing the member 77 back into clutching engagement with the member 76, after the solenoid is deenergized. This is accomplished by closing the inner end of the plunger passage formed within the spool, and by providing a checkvalve 83, at that end of the passage which is so arranged that it will permit a substantially free or unobstructed flow of air from the passage, as the plunger 81 moves inwardly, but will prevent a flow of air into the passage. With such an arrangement the plunger 81 is capable of moving rapidly, in response to the pull of the magnetic force, when the solenoid is energized, but the return motion of the plunger, is, impeded by air pressure, since the valve 83 prevents a flow of air into the passage as the plunger moves outwardly, and the only means of delivering air to the portion of the passage back of the plunger is through the clearance space between the plunger and the inner surface of its guide. The smaller this clearance space is made, the more the air delivery passage will be restricted, and consequently, the greater the retardation of the spring 78, and the slower the clutching operation of the clutch 13.

The speed change device, illustrated in Figs. 7, 8 and 9, consists of the driving shaft 14, the driven shaft 16, and the high, intermediate, low and reversing gears. As has been said, the shaft 14 is capable of being directly connected to the shaft of the engine 11, and the driven shaft 16 is operatively connected to the propeller shaft 15 of the vehicle. The high speed gears, illustrated, comprise gears 84 and 85, which are respectively mounted on the shafts 14 and 16. The gear 85 is rigidly mounted on the shaft 16 and the gear 84 is so mounted on the shaft 14, that, while it is positively locked against relative rotary motion, about the shaft, it is capable of being moved along the shaft, into and out of mesh with the gear 85. This may be accomplished in any desired manner, as for example, by splining the gear 84 on the shaft 14, or, as illustrated, by squaring a portion of the shaft. The intermediate speed gears comprise the gear 86, which is mounted upon the shaft 14, and a gear 87, which is rigidly mounted on the shaft 16. The gear 86, like the gear 84, is capable of being shifted to different positions along the shaft, so that it can be moved into and out of mesh with the gear 87. The low speed gears comprise a gear 88, mounted on the shaft 14, and, like the gears 84 and 86, movable longitudinally therealong, and a gear 89, which is rigidly mounted on the shaft 16.

The reversing gears, illustrated, comprise a gear 91, rigidly mounted on the shaft 14, an idler gear 92, mounted on the casing 93, of the speed change device, and a gear 94, splined on the shaft 16, and capable of being moved along the shaft and into and out of mesh with the idler gear 92, which is continuously in mesh with the gear 91. The gear 94 may be provided with any suitable means, such as an actuating lever 94', which may be manually operated to control the operation of the reversing gears.

The gears 84, 86 and 88 are automatically actuated by means of a gear-shifting device, which, as illustrated, comprises the motor 26, a gear 95, driven by the motor, a pin 96, which is actuated by the gear 95, and which is moved into and out of operative engagement with gear-shifting arms, with which each of the gears 84, 86 and 88 are provided. The gears 84 and 86, as shown, are rigidly secured together, and are provided in common with a gear-shifting arm 97, which is capable of shifting them longitudinally along the shaft 14, so that the gear 86 may be moved into or out of engagement with the gear 87, and the gear 84 may be moved into and out of engagement with the gear 85. As illustrated, the arm 97 projects upwardly through a slot 98, formed in the top of the casing 93, and is bifurcated at its upper end, for the purpose of engaging the actuating pin 96. As illustrated, the prongs 99, of the bifurcated end of the arm, are preferably separately formed and are so constructed that they form a shoulder which engages the upper face of the casing and which coöperates with the slot to guide the motion of the arm. The gear 88 is provided with an actuating arm 101, which also projects upwardly through the slot 98. The slot, as illustrated, consists of two parallel end portions 102 and 103, and an inclined intermediate portion 104, which connects the end portions. Each end portion is also provided with an extension or off-set 105, which coöperates with its corresponding end portion, in completing a way along which one or the other of the gear-shifting arms moves. For example, the gear-shifting arm 97 moves only in a direction parallel to the shaft 14, and its motion is confined to a path of travel along the end portion 102 and the corresponding extension 105 of the slot, while the arm 101 is confined to a path of travel along the end portion 103 and its coöperating extension 105. The pin 96, is, however, adapted to move through the entire length of the slot 98, but not into either of the extensions 105, and, in moving from one end of the slot to the other, it first actuates one of the gear-shifting arms, by moving it along its corresponding end portion of the slot 98, and then, after having traversed the intermediate inclined portion of the slot, it engages the other gear-shifting arm and moves it along its corresponding end portion of the slot.

The pin 96 is actuated by means of the gear 95, which is provided with a pin-receiving slot 106, into which the upper end of the pin projects, and in which it is loosely mounted. The slot 106 is so located that the pin is readily moved by it, through the slot 98. As illustrated, the slot 106 extends in a substantially radial direction, and the gear 95 is so located relatively to the slot 98, that the intersecting portion of the slot 106 extends at right angles to the slot 98 for all positions of the gear. As illustrated, the casing 93 is provided with an auxiliary top or cover, 107, which is provided with a slot similar to the slot 98, except that it is not provided with the extensions 105. This slot coöperates with the slot 98, and with the slot 106, provided on the gear, in guiding the pin through the slot 98, in response to motion of the gear, and in preventing it from binding, during its motion through the slots, and also from entering either of the extensions 105 of the slot.

The operation of the gear 95 is controlled by the coöperation of the automatic controller and the electro-mechanically actuated device 64, which consists of the electromagnet 42 and a pivotally mounted armature 108, provided at its outer end with an extension 109, capable of engaging one or another of a number of slots 110, suitably spaced around a flange 111, which is integrally formed with the rim portion of the gear 95 and which projects upwardly above the teeth of the gear. (See Figs. 7, 8 and 9). The electro-magnet 42 operates to raise the extension 109 out of its engaging slot 110 and it also serves to simultaneously close a switch which is located in the actuating circuit of the motor 26. As illustrated, the switch comprises two flexible contacts 112 and 113, which are diagrammatically shown in Figs. 2 and 10, located between the wires 63 and 65, and capable of completing an electrical circuit between those wires, when the armature is actuated by the magnet 42. The magnet 42 is energized when the contact piece 36 engages either pair of bars 35 or 35', on the controller plate 17, and this actuates the armature 108, to release the gear 95 and to simultaneously complete the operating circuit of the motor 26, by forcing the contact 113 upwardly into engagement with the contact 112. The armature is held in this position, irrespective of the pull of the magnet 42, by its engagement with the upper edge of the flange 111, and consequently, the motor circuit remains closed and the motor continues to drive the gear until the extension 109 of the armature falls into the next adjacent slot 110. When the armature drops into one of the slots 110 it simultaneously checks the motion of the gear 95 and cuts off the current to the motor 26. The slots 110 are so spaced that each movement of the gear 95 will render one or another of the sets of speed gears operative or inoperative, as power transmitting agents. For example, the gear 95 in moving in a counter-clockwise direction, as indicated by the feathered arrow, and from the position shown in Fig. 9, will move the pin 96 along the slot 98, so that it moves the gear 88 from the neutral position, shown in Fig. 7, to a position in which it meshes with the gear 89 and thereby renders the low speed set of gears effective in transmitting power to the driving axle of the vehicle. The gear 88 will occupy this position, relatively to the gear 89, when the gear 95 has moved to such a position that the armature extension 109 enters the slot 110$^B$. The next motion of the gear 95 in the counter-clockwise direction will cause the armature extension to drop into the slot 110$^C$ and will actuate the pin 96 to move the gear 88 to a neutral position on the right of the gear 89. During this movement of the gear 95 the pin 96 will also move the gear 86 into mesh with the gear 87. This is accomplished by sliding the pin 96 along the slot 98, so that it first shifts the gear-shifting arm 101 into the extension 105 of the portion 103 of the slot 98, and then moves through the inclined portion of the slot, into engagement with the gear-shifting arm 97, which it moves to such a position in the portion 102 of the slot 98, that the gear 86 shifts into mesh with the gear 87. The final movement of the wheel in the counter-clockwise direction actuates the pin 96 to move the arm 97 to such a position that the gear 86 is moved out of mesh with the gear 87, and the gear 84 is moved into mesh with the gear 85. This renders the intermediate set of gears inoperative and the high speed gears operative, as the driving gears of the vehicle; and it also moves the gear 95 to such a position, relatively to the armature 108, that the extension 109 drops into the slot 110$^D$. When the motor 26 is driven in the reverse direction, so that it turns the wheel 95 in a clockwise direction, and moves it from the position just described, in which the extension 109 engages the slot 110$^D$, the pin 96 operates first to render the high speed gears ineffective, and to render the intermediate speed gears effective as the driving gears of the car. A continued motion of the gear 95 in the clockwise direction causes the pin 96 to render the low speed gears effective as the driving agent of the car, after the intermediate speed gears have been rendered ineffective, and finally, when the gear is moved to the position shown in Fig. 9, the low speed gears are rendered ineffective and the extension 109 will enter the slot 110$^A$. It will, of course, be understood that during this operation of speed change device, the gear 94 of the reversing gears is moved out of mesh with the gear 92, so as to render the reversing gears inoperative.

The operation of shifting the gears of the speed change device positively shifts the position of the plate 17, relatively to the arm 18, and thereby changes its no-speed position for each set of speed gears employed in the transmission mechanism. This is accomplished by providing a rod 115 (see Figs. 7, 8 and 9) which is actuated by the gear-shifting arm 97 and which shifts the position of the plate-operating mechanism and also of the plate about the arbor 24. The rod 115 is operatively connected to a bell crank 116, (see Fig. 1) which, in turn, is operatively connected to a link 117, a bell crank 118, and a rod 119. One end of the rod 119 is pivotally secured to a pin 120 (see Fig. 4), which is mounted on an inner casing 121. The casing 121 is so mounted within the casing 19 that it is capable of swinging about the arbor 24, and the pin 120 projects through one slot 120ª formed in the casing 19, while the shaft 20 projects through a second slot 20ª. When the gear-shifting arm 97 is moved to the position shown in Fig. 7, and the gears 86 and 84 are in the neutral or inoperative position, with relation to the respective gears 87 and 85, the rod 115 shifts the actuating mechanism of the plate to such a position that the plate and the arm 18 occupy the relative positions shown in Fig. 10, when the engine and the vehicle are both at rest. When the gear-shifting arm is moved so as to render the intermediate gears operative as power transmission agents, the rod 115 shifts the position of the plate 17 to the dot-dash line position shown in Fig. 11, as will be further described, during the description of the operation of the apparatus. When the arm 97 is again moved to render the high speed gears operative, and the intermediate gears inoperative, the plate is again shifted by means of the rod 115, so that the arc, through which it moves in response to the variations in position of the centrifugal balls 21, is again varied with relation to the angle of action of the arm 118. I have also provided means for automatically breaking the actuating circuit of the motor 26 when the automatic controller tends to actuate the motor 26, to throw into operation a set of higher speed gears, after the highest speed gears have already been rendered operative. This may be accomplished in a number of ways, but, in the apparatus illustrated, I have provided a circuit breaker 68, which is shown in Figs. 2 and 10 located between the wires 67 and 69, and is adapted to break the motor control circuit when the arm 97 operates to shift the gear 84 to the right (Fig. 7) after that gear has been moved into mesh with the gear 85. In other words, the coöperation between the rod 115 and the circuit breaker 68 is such that the rod operates to break the control circuit of the motor 26, when the motor 26, operating in response to the operation of the automatic controller, tends to turn the gear 95 in a counter-clockwise direction, so that the slot 110ᴅ is moved beyond the extension 109. I have also provided a similar circuit breaker 66, for breaking the control circuit of the motor 26, when the gear 88 is moved into the neutral position, with relation to the gear 89. As shown in Figs. 2 and 10, this circuit breaker is similar to the circuit breaker 68, is located between the wires 65 and 67, which form a part of the motor control circuit; and it is controlled by means of a rod 123, which is secured to the gear-shifting arm 101. Both the rods 115 and 123 are shown provided with an elongated metal collar 124, which, for certain positions of their mounting rods, complete the metallic circuit between oppositely disposed spring contacts, which form a part of the circuit breaker. In Fig. 1, the circuit breakers are diagrammatically shown and each one consists of two spring contacts which are normally in engagement with each other, but which are adapted to be moved apart, for the purpose of breaking the circuit, by their respective actuating rods. A similar construction is diagrammatically shown in Figs. 2 and 10.

When the engine and the vehicle are both at rest, the centrifugal balls 21 and 21′ of the respective actuating mechanisms of the plate 17 and arm 18, are in their normal or inoperative positions, and the plate and arm consequently occupy their normal or no-speed positions. Under ordinary conditions the change speed gears of the speed change device, and the controlling apparatus of those gears, will occupy the positions shown in Figs. 7, 8 and 9, when the vehicle is at rest. The speed change device will be rendered inoperative and the circuit breaker 68 will break the circuit of the motor 26 when the vehicle comes to rest, and the plate 17 and arm 18 occupy the relative positions shown in Fig. 10. With the plate and the arm in these positions, the contact piece 28, on the arm, engages the bars 27′ and completes the ignition circuit; and the contact piece 36 contacts with the bars 35′ and energizes the solenoid 25 and the electro-magnet 42 of the timing device. This renders the master clutch 13 inoperative, as has been described, and also actuates the timing device to release the gear 95, and to complete the electrical connection between the wires 63 and 65 of the control circuit of the motor 26. The contact pieces 58 and 59, respectively, contact with the bars 49—51 and 56—57, when the plate and arm occupy the position illustrated in Fig. 10, and this would deliver current from the battery 32 to the motor, if it were not for the fact that the circuit breaker 68 were open. In order to start the vehicle the circuit breaker 68 must therefore be short circuited, and in addition to this, the current must be delivered through the motor 26, in a direction which will cause the motor to turn the gear 95 in a clockwise direction; that is, the motor must run in the direction it runs while actuating the gear 95 to shift from a low speed gear to a higher speed gear. This is accomplished by turning the manually actuated reversing switch 71 and thereby electrically connecting the wire 72 with the wire 69, by means of a wire 125, and by connecting the wire 65 with the wire 70. This completes the control circuit of the motor 26 and causes the motor to turn the gear 95 in a counter-clockwise direction and to thereby actuate the arm 101, through the agency of the pin 96, and to render the low speed gears of the speed change device operative, in transmitting power to the propeller shaft 15 of the vehicle. A switch 127, is located in the control circuit of a starting motor 128, for the engine 11. The turning of the switches 127 and 71 closes the control circuit of the motor 128, thereby starting the engine 11 and motor 26, which operates to throw in low gear 88. The shifting of the gear 88 closes the circuit breaker 68, and consequently the switch 71 and switch 127 can be opened as soon as the engine is started.

The running of the engine causes the plate 17 to turn about its pivotal point, in a clockwise direction, as indicated by the arrow in Fig. 10, and this movement of the plate carries the bars 35′ from under the contact piece 36, and breaks the energizing circuit of the solenoid 25 and of the electro-magnet 42, and the deënergizing of the solenoid permits the spring 78 to render the clutch 13 operative, and consequently, the vehicle starts as soon as the gear 88 is shifted into mesh with the gear 89. Prior to rendering the master clutch operative, the ignition circuit has been instantaneously broken and again closed by the passage of the contact piece 28 across the gap between the bars 27 and 27′. These bars are, however, so located on the plate, and the contact piece 28 is so proportioned that it will engage the bars 27 and complete the ignition circuit before the piece 36 is moved off of the bars 35′. As soon as the engine starts to drive the car, the arm 18 swings in a counter-clockwise direction, in response to its centrifugal controlling mechanism, and increases the distance between the bars 35′ and the contact piece 36. The increasing speed of the vehicle causes the centrifugal balls 21′ to move outwardly greater and greater amounts, and therefore moves the arm 18 across the plate 17 and eventually moves the contact pieces 58 and 59 off of the bars 49—51 and 56—57. This, however, has no effect upon the motor 26, since the deënergizing of the magnet 42 permits the armature 108 to drop into one of the slots 110 in the rim 111 after the gear 95 has turned sufficiently to render the low speed gears operative, and incidentally, to move the slot 110ᴮ immediately under the extension 109 of the armature.

It will be remembered that the dropping of the armature into one of the slots 110 permits the spring contact 113, of the circuit breaker located between the wires 63 and 65, to move out of contact with the contact 112, and to thereby break the motor control circuit. As the vehicle continues to increase in speed, the arm 18 continues to swing in a counter-clockwise direction, relatively to the plate, and the plate, due to the increasing speed of the engine, continues to move in a clockwise direction, and consequently the arm moves the contact pieces 58 and 59 into contact with the respective sets of bars 52—53, and 54—55, and finally completes the energizing circuit of the solenoid 25, and of the electro-magnet 42, by moving the piece 36 into contact with the bars 35. This simultaneously renders the master clutch 13 inoperative and completes the motor control circuit, by pressing the contacts 112 and 113 into engagement with each other. As soon as the master clutch 13 is rendered inoperative, the tendency of the engine is to speed up, but this is prevented, to a great extent, by so proportioning the length of the bars 27 that they are moved from under the contact piece 28 when the controller renders the clutch 13 inoperative.

The closing of the control circuit causes a current from the battery 32 to flow through the motor in a direction which will cause it to operate in the direction which will move the gear 95 in a counter-clockwise direction, (Fig. 9) so that it will shift the gear 88 out of mesh with the gear 89 and then render the intermediate speed gears operative, as power transmitting agents of the vehicle, by shifting the gear 86 into mesh with the gear 87. The starting of the motor 26 moves the slot 110, from which the armature 108 has been released, from under the extension 109 and the rim 111 holds the armature in the raised position by its engagement with the extension 109. This holds the contact 113 in engagement with the contact 112 and consequently continues the flow of current through the motor 26, independently of the position of the contact 36, with relation to the bars 35. In other words, after the timing device has been set, by the coöperation of the magnet 42 and a movement of the gear 95, the control circuit of the motor 26 will remain closed as long as the contact pieces 58 and 59 engage one or the other of their coöperating sets of contact bars and independently of the magnetization of the magnet 42. If the magnet 42 is de-magnetized at the time one of the slots 110 moves under the armature extension 109, the timing device will operate to break the motor circuit by the dropping of the extension into the slot. This will also lock the wheel 95 in position, until it is again released by the operation of the magnet 42.

As has been described, the operation of shifting the gear 86 positively shifts the position of the plate 17, with relation to the arm 18; the arrangement is such that this positive shifting of the plate, under the conditions described, will turn the plate in a counter-clockwise direction, so that the bars 35 are positively moved from under the contact piece 36 and the bars 27 are moved under and into engagement with the contact piece 28. This breaks the motor control circuit and also insures the passage of current through the ignition circuit. This positive shifting of the plate does not interfere with its centrifugal control, but merely changes the limits of its motion, in response to the operation of the centrifugal apparatus.

It will be apparent that, with the intermediate speed gears operative and the plate 17 having a positively adjusted operating position, the engine or the vehicle will have to increase in speed an amount greatly in excess of the speed at which the controller was capable of rendering the intermediate gear operative. If, however, the speed of the engine and the vehicle do increase to such an extent that the arm 18 is moved, relatively to the plate, so that the contact pieces 58 and 59 again contact with the bars 52—53 and 54—55, respectively, and the contact piece 36 again contacts with the bars 35, the master clutch will be again rendered inoperative, the motor control circuit will be again closed, and the motor 26 will operate to shift the gear 86 out of mesh with the gear 87 and the gear 84 into mesh with the gear 85. The operation of shifting the gear 84, positively shifts the position of the plate 17 and its centrifugal controlling apparatus. This shifting of the plate, for the purpose of establishing a new position thereof, positively moves the bars 35 out of engagement with the contact piece 36, and this, as has been said, breaks the energizing circuit of the solenoid 25 and the electro-magnet 42. This renders the clutch 13 operative and permits the motor control circuit to be broken by the timing device 64, as soon as the gear 95 has completed the operation of shifting the speed change gear 84. It will, of course, be understood, that under practical working conditions the speed of the engine will be somewhat reduced by the operation of throwing in a higher speed gear, and consequently, the plate 17 will tend to move, in response to the decrease in speed, in a counter-clockwise direction, rather than a clockwise direction. (See Fig. 10). This motion of the plate will prevent the clutch 13 from being again rendered inoperative, by having the contact piece 36 engage the bars 35; but, if the engine, while operating through the high speed gears, is capable of increasing in speed to such an extent that the contact piece 36 is again moved into engagement with the bars 35, the circuit breaker 66 will operate to break the control circuit of the motor 26 and thereby prevent the motor 26 from burning out, or the speed change device from being wrecked by the effort of the motor to move in a direction for throwing in a higher gear. After the controller has operated in response to conditions such as those just described, some means must be employed for actuating the circuit breaker 66 to again close the motor control circuit. As illustrated, I have provided a spring buffer 130, which is adapted to engage a lug 131, provided on the wheel 95. The buffer, while being incapable of stopping the motor 26, is so arranged that it moves the wheel back to the position in which the slot 110$^D$ is capable of being engaged by the extension 109, after the motor control circuit is broken by the operation of the circuit breaker 66. This operation of the controller does not in any way interfere with the operation of the vehicle, since it does not shift the gears of the speed change device, but allows the high speed gears to remain operative. For this reason it makes no difference how many times the circuit breaker 66 operates during the operation of the vehicle. Attention is also called to the fact that the contact piece 28, in moving off of the bars 27 breaks the ignition circuit, and consequently limits the speed of the engine.

While the vehicle is operating through the high speed gears and it encounters a grade or a stretch of road along which the engine cannot propel it, while operating at an efficient speed, the controller operates automatically to control the speed change device and render the high speed gears ineffective and the intermediate speed gears effective as a driving agent for the vehicle. This is accomplished owing to the fact that the decreasing speed of the engine, resulting from the heavy load imposed on it by driving the vehicle through the higher speed gears, and also the decreasing speed of the vehicle, respectively, cause the plate and the arm to move relatively to each other. The plate moves in a counter-clockwise direction, while the arm moves in a clockwise direction, and the result is that the arm and the plate eventually attain the relative positions illustrated in Fig. 12, in which the bars 35′ are engaged by the contact piece 36. This energizes the solenoid and the electro-magnet 42, and thereby renders the clutch 13 inoperative and actuates the timing device 64 to release the gear 95. It also moves the contact pieces 58 and 59 into contact with the respective bars 49—51 and 56—57, and consequently, the operation of the timing device completes the control circuit of the motor 26. The position of the arm 18 is, however, such that the passage of current through the motor 26, drives it in the reverse direction, so that the gear 95 is moved in a clockwise direction. (See Fig. 9.) This, as has been previously described, shifts the positions of the gears 84 and 86, and renders the high speed gears inoperative and the intermediate speed gears operative. During the shifting of the speed change gears, the plate 17 is positively turned by the rod 115 to the position shown in dot-dash lines in Fig. 12. This motion of the plate is, in itself, capable of moving the bars 35' from under the contact piece 36 and of thereby deënergizing the solenoid and the electromagnet 42. As soon as the solenoid is deënergized, and the clutch 13 is rendered operative, the engine starts to drive the gear through the intermediate gears, and, owing to the fact that the load is lessened, the engine will tend to speed up, and consequently, to move the plate in the clockwise direction, so that the bars 35' are moved away from the plate 36 and the bars 49—51 and 56—57 are respectively moved from under the contact pieces 58 and 59. If the load on the engine is such that the engine cannot effectively drive the vehicle through the intermediate speed gears, the controller will again operate to shift from the intermediate to the low speed gears and thereby still further reduce the load on the engine.

The operation of shifting from the intermediate to the low speed gears is substantially the same as has just been described. As the motor 26 operates to shift the gear 86 out of mesh with the gear 87, it also positively shifts the plate 17 about the arbor 24 and in a clockwise direction, so that the plate is capable of moving to the position shown in Fig. 10, in response to the operation of the centrifugal control apparatus. As soon as the motor speeds up, in response to the lightened load, occasioned by the withdrawal of the master clutch 13, the bars 35' are moved from under the contact piece 36, and the low speed gears are rendered effective as the driving agent of the vehicle. If the vehicle encounters a grade or a stretch of road along which it cannot be propelled by the engine while operating through the low speed gears, the controller will operate to relieve the engine of the load of the vehicle and thereby prevent it from being stalled. This results from the fact that the arm 18, in moving relatively to the plate 17, to the position illustrated in Fig. 10, renders the clutch mechanism 13 inoperative, and causes the motor 26 to shift the gear 88 to the neutral position, with relation to the gear 89, and to simultaneously actuate the circuit breaker 68, and thereby break the control circuit of the motor 26. This relieves the engine of the load of the vehicle and the vehicle cannot be started with the parts in the position described, (see Fig. 7,) except by throwing the switch 71 into the operative position. When the switch 71 is moved to the operative position it reverses the flow of current through the control circuit of the motor 26, without the necessity of having the arm 18 swing to the opposite position, with relation to the plate 17 and, as has been described, the motor 26 operates to move the gear 88 into engagement with the gear 89 and to again close the circuit breaker 68. If the load is still too great for the engine while operating through the low speed gears, the plate will move in a counter-clockwise direction, due to the decreasing speed of the engine, as soon as the master clutch is rendered operative, and consequently, the bars 35' will be again engaged by the contact piece 36, and the motor 26 will again operate to shift the gear 88 to the neutral position.

From this description it will be seen that the automatic controller moves in response to variations in the relative speeds of the engine shaft and the propeller shaft of the vehicle, and renders a high or a low speed set of gears operative, in response to variations in the load encountered by the engine; and that consequently the engine will operate with maximum efficiency at all times. Attention is also called to the fact that, if the engine 11 is stopped while the speed change device is operating through the high or the intermediate gears, the motor 26 will operate to successively shift from one set of speed change gears to the next lower set until the low speed gears are finally rendered inoperative and the circuit breaker 68 is operated to break the control circuit of the motor 26. The contact bars on the plate 17 and the coöperating contact piece on the arm 18 are so arranged that the arm in moving from an intermediate position, relatively to the plate, toward one side or the other of the plate, first moves the contact pieces 58 and 59 into engagement with one set of their respective coöperating bars and then moves the contact piece 36 into engagement with one or the other sets of its coöperating bars. With this arrangement, the contact pieces 58 and 59 prepare the control circuit of the motor 26, so that, when it is completed, by the engagement of the piece 36 with one or the other set of bars 35 and the resultant operation of the magnet 42, current will flow through the motor in the desired direction. The bars 27 are of such length and so located on the plate 17 that they will break the ignition circuit at, or immediately prior to, the time that the contact piece 36 engages the bars 35'. This permits the clutch 13 to be withdrawn while there is no load on the transmission mechanism, and consequently, while there is no torsional pull between separate members of the clutch. It also insures such a relative movement of the plate and arm that the contacting pieces 36, 58 and 59 will be retained upon their coöperating contact bars a sufficient length of time to insure the operation of the speed change device. The retarding or dash-pot action of the solenoid spool on the plunger 81 can also be adjusted, by proportioning the clearances between the inner surface of the spool and the plunger, so that the master clutch 13 will not be rendered effective until after the motor 26 has had sufficient time to render one or the other sets of speed change gears effective.

In the drawings I have provided a stop at each end of the plate 17, for limiting the motion of the arm 18, relatively to the plate. These stops prevent the arm from moving off of the plate, but they do not in any way affect the operation of the controller, since a shifting of the speed change device and the resultant variation in speed of the engine and the vehicle, always tends to vary the relative positions of the plate and arm, so that the arm moves to an intermediate position with relation to the plate.

In Figs. 2 and 10 I have shown the switch 45, so connected to the wiring of the controller that it will render the controller incapable of automatically shifting the gears, and will complete the ignition circuit, independently of the operation of the controller. As illustrated, the switch 45 is so located that when it is thrown to the position shown in dotted lines in Fig. 2, it will short circuit the bars 27 and 27' and will break the energizing circuit of the solenoids 25 and 42. This closes the ignition circuit through the wire 39, a wire 128', the switch 45 and the wire 129, which connects with one leg of the ignition circuit. As has already been described, the other leg of the circuit is grounded on the frame of the vehicle.

In accordance with the United States patent statutes, I have illustrated and described the preferred embodiment of my invention, but I desire it to be understood that various changes, modifications and substitutions may be made in the apparatus illustrated, without departing from the spirit and scope of my invention as set forth by the appended claims.

What I claim is:

1. In a transmission mechanism, a driving agent, a driven agent, means for varying the torque or purchase of the driving agent on the driven agent, and means, responsive to variations in the speed of rotation of the driving and driven agents, for controlling the operation of said first-mentioned means.

2. In a transmission mechanism, a driving agent, a driven agent, turning moment varying means between said driving and said driven agent and means, responsive to variations in the speed of rotation of said driving and said driven agent for controlling said first-mentioned means.

3. In a transmission mechanism, a driving agent, a driven agent, a speed change device between said agents and means, responsive to variations in the speed of rotation of both of said agents, for controlling the operation of said speed change device.

4. In a transmission mechanism, a driving agent, a driven agent, a speed change device between said agents, and centrifugally controlled means, responsive to variations in speed of both of said agents, for controlling the operation of said device.

5. In a transmission mechanism, a driving agent, a driven agent, a speed change device, means for setting the speed change device to different operative positions and a controller for controlling the operation of said means, comprising, means responsive to the speed of the driving agent and coöperating means responsive to the speed of the driven agent.

6. In combination with a transmission mechanism including a driving agent and a driven agent, a speed change device, means for setting the speed change device to different operative positions, and a controller for controlling the operation of said means, comprising, a centrifugally controlled member responsive to variations in the speed of the driving agent and a coöperating centrifugally controlled member, responsive to variations in the speed of the driven agent.

7. In combination with a transmission mechanism including a driving agent, a driven agent and a speed change device between said agents, means for setting the speed change device to different operative positions, apparatus for controlling the operation of said means, and a controller, responsive to variations in speed of both of said agents, for controlling the operation of the apparatus.

8. In a transmission mechanism, a driving agent, a driven agent, a speed change device between said agents, a clutch mechanism between the driving agent and the speed change device, and load-responsive means for controlling the operation of the speed change device and said clutch.

9. In a transmission mechanism, a driving agent, a driven agent, speed change gears between said agents, a clutch mechanism between the gears and the driving agent, and load-responsive means for controlling the operation of the clutch mechanism and for shifting said speed change gears.

10. In a transmission mechanism, a driving agent, a driven agent, a speed change device between said agents, a clutch mechanism between said device and said driving agent, and means responsive to variations in the speeds of rotation of said agents, for controlling the operation of said clutch mechanism and said speed change device.

11. In a transmission mechanism, a driving agent, a driven agent, a speed change device between the agents, a clutch mechanism between the device and the driving agent, means for shifting the gears of the speed change device, and a controller, responsive to variations in speed of both of said agents, for controlling the operation of said means and of said clutch mechanism.

12. In a transmission mechanism, a driving agent, a driven agent, a speed change device between the agents, a clutch mechanism between the device and the driving agent, means for setting the speed change device to different operative positions, and a controller for said means and the clutch mechanism, comprising a member responsive to variations in the speed of the driving agent, and a coöperating member responsive to variations in speed of the driven agent.

13. In a transmission mechanism, a driving agent, a driven agent, a speed change device between said agents, means for setting the speed change device to different operative positions, and a controller for controlling the operation of said means, comprising a member responsive to speed variations of the driving agent, and a coöperating member responsive to speed variations of the driven agent.

14. In a transmission mechanism, a driving agent, a driven agent, a speed change device between said agents, means for setting the speed change device to different operative positions, a motor for actuating said means, a control device for controlling the operation of the motor, and a controller responsive to load variations for controlling the operation of said control device.

15. In a transmission mechanism, a driving agent, a driven agent, a speed change device between said agents, means for setting the speed change device to different operative positions, a control device for controlling the operation of said means, and a controller for controlling the operation of said control device, comprising a member responsive to the variations in the speed of the driving agent, and a coöperating member responsive to variations in the speed of the driven agent.

16. In a transmission mechanism, a speed change device, means for setting the speed change device to different operative positions, an electric motor for actuating said means, a control device for controlling the delivery of current to the motor, and a load-responsive controller for controlling the operation of the control device and for reversing the operating current to the motor.

17. In a transmission mechanism, a driving agent, a driven agent, a speed change device, electrically actuated means for setting the speed change device to different operative positions, a controller responsive to variations in the speeds of the driving and driven agents for controlling the operation of said means, and a cut-out actuated by said speed change device for cutting off current to said means, when the speed change device is moved by said means to a determined position.

18. In combination with a driving agent and a driven agent, a speed change mechanism between said agents, means for setting the speed change mechanism to different operative positions, a load responsive controller for controlling the operation of said means, and a device actuated by said mechanism for rendering said means inoperative.

19. In a transmission mechanism, a speed change device, comprising a plurality of sets of speed change gears, means for shifting said gears, a motor for actuating said means, a control device for controlling the operation of the motor, a load responsive means for controlling said motor and said control device.

20. In combination with a driving agent and a driven agent, a speed change device between said agents, a clutch mechanism between the driving agent and said device, means for setting the device to different operative positions, a motor for actuating said means, and a controller responsive to variations in the speeds of said agents for controlling the operation of said motor and said clutch mechanism.

21. In combination with a driving and a driven agent, a speed change device between said agents, a clutch mechanism between the device and the driving agent, electrically actuated means for setting the speed change device to different operative positions, a solenoid for controlling the operation of the clutch mechanism, and a controller responsive to variations in the speeds of said agents for controlling the operation of said means and of said solenoid.

22. In combination with a driving and driven agent, a speed change device between the agents, a means for setting the speed change device to different operative positions, a motor for actuating the means, a device for locking the means in determined positions and for controlling the operation of the motor, and a controller responsive to variations in the speeds of said agents for controlling the operation of the motor and the device.

23. In combination with a driving and driven agent, a speed change mechanism, motor driven means for setting the speed change mechanism to different operative positions, a device engaging said means for controlling the delivery of current to the motor, and a controller for controlling the operation of the device and for reversing the current to the motor, comprising an element responsive to variations in the speed of the driving agent, and provided with electrical contact bars and a coöperating element for engaging said bars, responsive to variations in speed of the driven agent.

24. In combination with a driving and driven agent, a speed change device, electrically actuated means for setting the speed change device to different operative positions, and a controller for controlling the operation of said means, comprising a member provided with electrical contact bars included in the actuating circuit of said means, and responsive to speed variations of one of said agents, and a coöperating member for completing contacts between said bars of the first-mentioned member and responsive to variations in speed of the other agent.

25. In a transmission mechanism, a driving agent, a driven agent, a speed change device between said agents, a clutch mechanism between said device and the driving agent, a speed responsive controller for varying the torque or purchase of the speed change device, and for rendering the clutch mechanism inoperative during the torque varrying operation.

26. In a transmission mechanism, a driving agent, a driven agent, speed change gears between said agents, a clutch mechanism between said gears and said driving agent, load-responsive means for shifting the gears and for rendering the clutch mechanism inoperative during the gear shifting operation.

27. In a transmission mechanism, a driving agent, a driven agent, speed change gears between said agents, a clutch mechanism between the gears and the driving agent, means for shifting the gears and load-responsive means for controlling the operation of said means and for rendering the clutch mechanism inoperative, during the operation of shifting the gears.

28. In a transmission mechanism, a driving agent, a driven agent, a speed change device between said agents, means for varying the torque or purchase of the speed change device, and load-responsive means for controlling the operation of said first-mentioned means and for varying the speed of the driving agent during the torque varying operation.

29. In a transmission mechanism, a driving agent, a driven agent, a speed change device between said agents, a clutch mechanism between the driving agent and the speed change device, load-responsive means for varying the torque or purchase of the speed change device, for rendering the clutch mechanism inoperative and for varying the speed of the driving agent during the torque varying operation.

30. In a transmission mechanism, a driving agent, a driven agent, speed change gears between the agents, a clutch mechanism between the gears and the driving agent, means for shifting the speed change gears and load-responsive means for controlling the operation of the gear shifting means and for rendering the clutch mechanism inoperative during the operation of shifting the gears and for varying the speed of the driving agent.

31. In a transmission mechanism, a driving agent, a driven agent, speed change gears between said agents, a clutch mechanism between said gears and the driving agent, load-responsive means for shifting the gears, for rendering the clutch mechanism inoperative during the gear-shifting operation, and for varying the speed of the driving agent during the gear-shifting operation.

32. In a transmission mechanism, a driving agent, a driven agent, a speed change device between said agents, a controller for the speed change device comprising a member, movable in response to speed variations of the driving agent, a coöperating member movable relatively to the first-mentioned member, in response to speed variations of the driven agent, and means, actuated by the speed change device, for shifting the relative positions of said members.

33. In a transmission mechanism, a driving agent, a driven agent, a speed change device between the agents, a controller comprising members independently movable in response to variations in the relative speed of said agents, for controlling the operation of the speed change device, and means, actuated by the speed change device, for varying the relative positions of said members.

34. In a transmission mechanism, a driving agent, a driven agent, speed change gears between said agents, means for shifting said gears, a controller for controlling the operation of said means and comprising an element movable in response to speed variations of the driving agent, and a coöperating element movable in response to speed variations of the driven agent, and means, actuated by the shifting of said gears, for positively shifting the relative positions of said element.

35. In a transmission mechanism, a driving agent, a driven agent, a speed change device between said agents, a clutch mechanism between the device and the driving agent, electrical means for controlling the operation of the speed change device and the clutch mechanism, a controller operative in response to variations in the speeds of said agents, for controlling the operation of said means and means, actuated by the speed change device for varying the operation of the controller.

36. In a transmission mechanism, a driving agent, a driven agent, a speed change device between the agents, electrical means for controlling the operation of the speed change device, a clutch mechanism between the device and the driving agent, electrical means for controlling the operation of the clutch mechanism and a controller, responsive to variations in the relative speeds of said agents, for controlling the operation of both of said means and for varying the speed of the driving agent, during the operation of the first-mentioned means.

37. In a transmission mechanism, a driving agent, a driven agent, a speed change device between the agents, means for setting the speed change device to different operative positions, a locking device restrained by said means for controlling the operation thereof, and a controller for said means and said locking device, comprising members movable relatively to each other, in response to variations in the speeds of the agents.

38. In a transmission mechanism, a driving agent, a driven agent, speed change gears between said agents, electrically actuated means for shifting the gears, an electro mechanical device restrained by said means for controlling the operation thereof, a clutch mechanism between the gears and the driving agent, electrically actuated means for controlling the operation of the clutch mechanism and a controller, responsive to variations in the speeds of said agents, for controlling the operation of both of said means and said electro-mechanical device.

39. In a transmission mechanism, a driving agent, a driven agent, speed change gears between said agents, means for shifting the gears, a device restrained by said means for controlling the operation thereof, a clutch mechanism between the gears and the driving agent, means for controlling the operation of the clutch mechanism, a controller for controlling the operation of both of said means and the device, comprising elements movable relatively to each other, in response to variations in the speed of said agents, and means, actuated by the gear shifting operation, for changing the relative positions of said elements.

In testimony whereof, I have hereunto subscribed my name this 3rd day of April, 1913.

CHARLES S. REINHART.

Witnesses:
RALPH H. INOTT,
E. W. McCALLISTER.